(12) United States Patent
Jha et al.

(10) Patent No.: US 12,489,312 B2
(45) Date of Patent: Dec. 2, 2025

(54) ELECTRIC AIRCRAFT EMERGENCY POWER SUPPLY MODULE, AIRCRAFT EMERGENCY LIGHTING MODULE, AND METHOD OF CHARGING A POWER CELL OF AN ELECTRIC AIRCRAFT EMERGENCY POWER SUPPLY MODULE

(71) Applicant: Goodrich Lighting Systems GmbH & Co. KG, Lippstadt (DE)

(72) Inventors: Anil Kumar Jha, Lippstadt (DE); Andre Hessling-Von Heimendahl, Koblenz (DE); Jens Leuschner, Möhnesee (DE); Andreas Ueberschaer, Gütersloh (DE); Robert Trinschek, Hamm (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 31 days.

(21) Appl. No.: 18/503,622

(22) Filed: Nov. 7, 2023

(65) Prior Publication Data

US 2024/0154455 A1    May 9, 2024

(30) Foreign Application Priority Data

Nov. 8, 2022    (EP) .................................... 22206184

(51) Int. Cl.
*H02J 9/04*    (2006.01)
*H02J 7/00*    (2006.01)

(52) U.S. Cl.
CPC .............. *H02J 9/04* (2013.01); *H02J 7/0016* (2013.01); *H02J 7/007194* (2020.01); *H02J 2310/44* (2020.01)

(58) Field of Classification Search
CPC ...... H02J 9/04; H02J 7/007194; H02J 7/0016; H02J 2310/44
See application file for complete search history.

(56) References Cited

U.S. PATENT DOCUMENTS 4,503,378 A * 3/1985 Jones ................ H02J 7/007184
320/161
5,477,125 A * 12/1995 Ettel ................. H02J 7/007182
320/156

(Continued)

OTHER PUBLICATIONS

European Search Report for Application No. 22206184.8, mailed Jun. 27, 2023, 9 pages.

*Primary Examiner* — Carlos Amaya
(74) *Attorney, Agent, or Firm* — CANTOR COLBURN LLP

(57) ABSTRACT

An electric aircraft emergency power supply module, which is connectable to an electric charger, comprises: at least one electric power cell for storing and supplying electric energy; at least one voltage sensor for measuring the electric voltage (U) of the at least one electric power cell; and a controller for controlling a charging of the at least one electric power cell. Controlling the charging of the at least one electric power cell includes receiving a voltage indication signal (U(t)), indicative of the electric voltage (U) of the at least one electric power cell over time (t), from the at least one voltage sensor; determining the second derivative (U"(t)) of the voltage indication signal (U(t)) with respect to time (t); and on the basis of a positive-to-negative zero crossing of the second derivative (U"(t)) of the voltage indication signal (U(t)), simulating the behavior of a temperature sensitive element.

14 Claims, 7 Drawing Sheets

(56) References Cited

U.S. PATENT DOCUMENTS

| | | |
|---|---|---|
| 5,821,736 A | 10/1998 | Yeon |
| 6,043,631 A | 3/2000 | Tsenter |
| 6,313,605 B1 | 11/2001 | Tsenter |
| 7,129,675 B2 | 10/2006 | Brecht |
| 7,589,491 B2 * | 9/2009 | Brecht .............. H02J 7/007194 |
| | | 320/128 |
| 2022/0311256 A1 * | 9/2022 | Hessling-von Heimendahl .......... |
| | | H02J 7/0048 |

* cited by examiner

ELECTRIC AIRCRAFT EMERGENCY POWER SUPPLY MODULE, AIRCRAFT EMERGENCY LIGHTING MODULE, AND METHOD OF CHARGING A POWER CELL OF AN ELECTRIC AIRCRAFT EMERGENCY POWER SUPPLY MODULE

CROSS REFERENCE TO RELATED APPLICATIONS

This application claims priority to European Patent Application No. 22206184.8 filed Nov. 8, 2022, the entire contents of which is incorporated herein by reference.

TECHNICAL FIELD

The present invention is in the field of electric aircraft power supply. The present invention is particularly related to an electric aircraft emergency power supply module and to an aircraft emergency lighting module comprising such an electric aircraft emergency power supply module. The present invention is further related to an aircraft comprising such an electric aircraft emergency power supply module, and to a method of charging a power cell of an electric aircraft emergency power supply module.

BACKGROUND

Aircraft usually comprise an electric power system including at least one aircraft power supply, which is configured for supplying electric power to electric consumers within the aircraft. Such aircraft power supplies may be connected to generators driven by the engines and/or to electric terminals, which allow connecting an external electric power supply to the aircraft, when the aircraft is located on the ground.

Aircraft further usually comprise many electric aircraft emergency power supply modules, which are configured for supplying electric power in case electric power is not available from the normally used aircraft power supplies. This allows for operating electric consumers of the aircraft, in particular safety relevant electric consumers of the aircraft, such as aircraft emergency lights, in case of failure of the normally used aircraft power supplies.

Electric aircraft emergency power supply modules comprise at least one electric power cell for storing and supplying electric energy. Aircraft comprising at least one electric aircraft emergency power supply module further comprise a charge controller ("electric charger") for monitoring and controlling the electric charging and discharging of the at least one electric power cell.

The lifetime of electric power cells heavily depends on the charging scheme, which is applied for charging the electric power cells. In particular, overcharging the electric power cells may increase the temperature of the electric power cells and considerably reduce the lifetime of the electric power cells.

It would therefore be beneficial to provide an electric aircraft emergency power supply module comprising at least one electric power cell, which allows for charging the at least one electric power to a large extent, e.g. close to a full charging level, without overcharging the at least one electric power cell.

SUMMARY

Exemplary embodiments of the invention include an electric aircraft emergency power supply module, which is electrically connectable to an electric charger and which comprises: at least one electric power cell for storing and supplying electric energy; at least one voltage sensor for measuring the electric voltage of the at least one electric power cell; and a controller for controlling a charging of the at least one electric power cell. According to an embodiment of the invention, controlling the charging of the at least one electric power cell includes: receiving a voltage indication signal, which is indicative of the electric voltage of the at least one electric power cell as a function of time, from the at least one voltage sensor; determining the second derivative of the voltage indication signal with respect to time; and, on the basis of a positive-to-negative zero crossing of the second derivative of the voltage indication signal, simulating the behavior of a temperature sensitive element to indicate that the at least one electric power cell has reached a predefined temperature, which corresponds to a predefined charging level, for causing the electric charger to stop charging the at least one electric power cell.

The electric charger is usually not part of the electric aircraft emergency power supply module. The electric charger may in particular be installed within the aircraft for being electrically connected to a replaceable electric aircraft emergency power supply module, in particular to a replaceable electric aircraft emergency power supply module according to an exemplary embodiment of the invention.

Exemplary embodiments of the invention further include a method of charging at least one electric power cell of an electric aircraft emergency power supply module, wherein the method comprises: supplying an electric charging current from an electric charger to said at least one electric power cell for charging said at least one electric power cell; measuring the electric voltage of the at least one electric power cell; and determining the second derivative of the measured electric voltage with respect to time. The method further includes, on the basis of a positive-to-negative zero crossing of the second derivative of the measured electric voltage, simulating the behavior of a temperature sensitive element to indicate that the at least one electric power cell has reached a predefined temperature, which corresponds to a predefined charging level, for causing the electric charger to stop charging the at least one electric power cell.

The positive-to-negative zero crossing may be determined in a number of ways.

The positive-to-negative zero crossing may be a "hard zero crossing". For detecting a "hard zero crossing", it is detected that the second derivative of the voltage indication signal changes from a positive value to a negative value.

Alternatively, the positive-to-negative zero crossing may be an "expected zero crossing". For detecting an "expected zero crossing", it is detected that the second derivative of the voltage indication signal drops below a predefined positive threshold value, which is close to zero. The predefined positive threshold value may, for example, be a value in the range of between $0.1\ \mu V/s^2$ and $4\ \mu V/s^2$, in particular between $0.5\ \mu V/s^2$ and $3\ \mu V/s^2$. It is expected that the second derivative of the voltage indication signal drops further below zero, after it has dropped below the predefined positive threshold value.

As a further alternative, positive-to-negative zero crossing of the second derivative of the voltage indication signal may detected, when the voltage indication signal drops below a negative threshold value, which is close to zero. The negative threshold value may, for example, be a value in the range of between $-0.2\ \mu V/s^2$ and $-8.5\ \mu V/s^2$, in particular between $-1.0\ \mu V/s^2$ and $-6.0\ \mu V/s^2$. It is assumed that the second derivative of the voltage indication signal has dropped from a positive value to a negative value, before it drops below the predefined negative threshold value.

The described methods for detecting positive-to-negative zero crossings are only exemplary. There may be further methods for detecting positive-to-negative zero crossings, which are not described in detail herein.

A positive-to-negative zero crossing of the second derivative of the voltage indication signal provides a reliable indicator that the at least one electric power cell has been charged up to or at least very close to its full capacity. Stopping the charging of the at least one electric power cell, after a positive-to-negative zero crossing of the second derivative of the voltage indication signal has been detected, may therefore result in charging the at least one electric power cell very close to its full capacity, without overcharging the at least one electric power cell. As a result, the operational time of the at least one electric power cell may be high, after being charged in the described manner. Also, the lifetime of the at least one electric power cell may be optimized.

An electric aircraft emergency power supply module and a method of charging a power cell of an electric aircraft emergency power supply module according to exemplary embodiments of the invention may in particular allow to reliably prevent a reduction of the lifetime of the at least one electric power cell due to overcharging. An electric aircraft emergency power supply module and a method according to an exemplary embodiments of the invention may further allow to avoid the operational time of the at least one electric power cell to be reduced, because the charging of the at least one electric power cell has been stopped, before the at least one electric power cell has been charged to or very close to its full capacity. An optimized trade-off between making good use of the capacity of the at least one electric power cell and ensuring a long lifetime of the at least one power cell may be achieved.

Simulating the behavior of a temperature sensitive element to indicate that the at least one electric power cell has reached a predefined temperature, which corresponds to a predefined charging level, for causing the electric charger to stop charging the at least one electric power cell according to exemplary embodiments of the invention allows for replacing a conventional electric aircraft emergency power supply module, which comprises electric power cells of a first type, with an electric aircraft emergency power supply module comprising electric power cells of a second type, which differs from the first type, without modifying or replacing the electric charger. In consequence, an electric aircraft emergency power supply module, comprising electric power cells of a first type, may be replaced quickly, easily, and conveniently with an electric aircraft emergency power supply module according to an embodiment of the invention, which comprises electric power cells of a second type, without generating additional effort or costs.

Exemplary embodiments of the invention may in particular allow for replacing a conventional electric aircraft emergency power supply module, comprising electric power cells of the NiCd-type, with an electric aircraft emergency power supply module comprising electric power cells having improved electric properties, such as electric power cells of the NiMH-type, without modifying or replacing the electric charger within the aircraft.

According to an embodiment, the voltage indication signal comprises a plurality of voltage indication values and the controller is configured for receiving a new voltage indication value, determining the second derivative of the voltage indication signal, and making a determination regarding the positive-to-negative zero crossing of the second derivative of the voltage indication signal in a repeated manner. This may allow for continuously monitoring the charging level of the at least one electric power cell and for reliably preventing any further charging of the at least one electric power cell, when the predefined charging level, which is defined by a positive-to-negative zero crossing of the second derivative of the voltage indication signal, has been reached.

According to an embodiment, the steps of receiving a new voltage indication value, determining the second derivative of the voltage indication signal, and making a determination regarding the positive-to-negative zero crossing of the second derivative of the voltage indication signal are executed once during a predefined time interval. The aforementioned steps may be repeated in time intervals that are in the range of between 1 second and 120 seconds, in particular in time intervals that are in the range of between 10 seconds and 60 seconds. Such time intervals have been found as well suited for reliably determining a full charging level of the at least one electric power cell, without damaging the at least one electric power cell due to overcharging, while being manageable in computing complexity.

According to an embodiment, the controller is configured for determining that a positive-to-negative zero crossing has only then occurred, when the second derivative of the voltage indication signal is negative for at least a predetermined period of time or when the second derivative of the voltage indication signal is negative for at least a predefined number of consecutive voltage indication values. This may allow to prevent that the charging of the at least one electric power cell is accidentally stopped too early, i.e. before the desired charging level of the at least one electric power cell has been reached, due to temporary fluctuations of the voltage indication signal. In consequence, the reliability of the charging of the at least one electric power cell may be enhanced.

According to an embodiment, the controller is configured to simulate the behavior of the temperature sensitive element to indicate that the at least one electric power cell has reached the predefined temperature only if the third derivative of the voltage indication signal is below zero at the positive-to-negative zero crossing of the second derivative of the voltage indication signal. The third derivative may be used as an additional check/verification that a turning point from a left hand turn to a right hand turn in the voltage indication signal is present. In consequence, the reliability of the charging of the at least one electric power cell may be enhanced.

According to an embodiment, the controller is configured to simulate the behavior of the temperature sensitive element to indicate that the at least one electric power cell has reached the predefined temperature only if the electric voltage of the at least one electric power cell exceeds a predefined minimum voltage value, in particular a predefined minimum voltage value in the range of between 8 V and 10 V, more particularly a predefined minimum voltage value of approximately 8.5 V. Stopping the charging of the at least one electric power cell only if the electric voltage of the at least one electric power cell exceeds a predefined minimum voltage value may allow to prevent that the charging the at least one electric power cell is accidentally stopped early due to temporary fluctuations of the voltage indication signal, before the predefined charging level of the at least one electric power cell has been reached. In consequence, the reliability of the charging of the at least one electric power cell may be enhanced. The given value ranges for the predefined minimum voltage value may in particular apply to electric aircraft emergency power supply modules that have seven electric power cells of the NiMH-type. The series arrangement of seven electric power cells of the NiMH-type have been found to be a good fit for existing aircraft emergency power supply architectures. It is pointed out that other predefined minimum voltage values may be used for implementations with different numbers of electric power cells and/or different types of electric power cells.

According to an embodiment, the at least one electric power cell is at least one electric power cell of the NiMH-type. Electric power cells of the NiMH-type may have a large capacity-to-weight ratio, i.e. a low weight for a given charge capacity. They are robust, may have a long lifetime, and are beneficial from an ecological point of view.

According to an embodiment, the predefined temperature is the temperature of an electric power cell of the NiCd-type that is being supplied with an electric charging current and has reached its fully charged state. Such an electric aircraft emergency power supply module may conveniently replace an electric aircraft emergency power supply module, which comprises electric power cells of the NiCd-type, which are frequently employed in conventional electric aircraft emergency power supply modules. By simulating the thermal behavior of electric power cells of the NiCd-type at the end of a charging operation, the electric charger, which monitors the thermal behavior of the NiCd-type electric power cells for stopping its charging operation in conventional set-ups, is provided with the same information regarding the stopping of the charging operation. Albeit not necessarily reflecting the actual temperature of the at least one electric power cell, the simulated predefined temperature provides is a reliable signal to the electric charger to stop the charging operation. The electric charger is effectively controlled by the electric aircraft emergency power supply module, without having knowledge of or being adapted to the actual implementation of the electric aircraft emergency power supply module.

In an embodiment, the simulator is configured for simulating the electric behavior of at least one NTC thermal resistor and/or of at least one PTC thermal resistor. NTC or PTC thermal resistors are frequently employed in conventional electric aircraft emergency power supply modules for monitoring the charging level of the electric power cells. A simulator simulating the electric behavior of at least one NTC thermal resistor and/or of at least one PTC thermal resistor may therefore allow for easily replacing this kind of electric aircraft emergency power supply modules with an electric aircraft emergency power supply module according to an embodiment of the invention.

In an embodiment, the electric aircraft emergency power supply module comprises a plurality of electric power cells. The electric power cells may be connected in a serial configuration and/or in parallel with each other. Combining a plurality of electric power cells may allow for expanding the electric capacity provided by the electric aircraft emergency power supply module. Serially connecting a plurality of electric power cells may allow for increasing the voltage, which is supplied by the plurality of electric power cells. Connecting a plurality of electric power cells in a parallel configuration may allow for increasing the maximum electric current, which may be drawn from the plurality of electric power cells in an emergency operation.

In an embodiment, the electric aircraft emergency power supply module comprises between five and ten electric power cells, in particular between five and ten electric power cells of the NiMH-type, connected in series. In a particular embodiment, the electric aircraft emergency power supply module comprises seven electric power cells of the NiMH-type, connected in series. It has been found that such an arrangement of seven electric power cells of the NiMH-type, connected in series, is particularly suitable for replacing existing implementations of electric aircraft emergency power supply modules that are based on NiCd technology.

In an embodiment, the electric aircraft emergency power supply module comprises at least one electric bypass circuit, which is configured for selectively bypassing the at least one electric power cell. An electric bypass circuit allows for selectively routing electric currents, in particular charging currents and discharging currents, which flow through the electric aircraft emergency power supply module, around the at least one electric power cell. The at least one electric power cell may in particular be bypassed, in order to allow for measuring the internal voltage of the at least one electric power cell, without the measurement being distorted by electric currents flowing through the at least one electric power cell.

Embodiments comprising more than one electric power cell may comprise a single electric bypass circuits, which is configured for collectively bypassing all the electric power cells.

Alternatively, an electric aircraft emergency power supply module comprising more than one electric power cell may also comprise a plurality of electric bypass circuits. Such an electric aircraft emergency power supply module may in particular comprise a separate electric bypass circuit for each electric power cell. Such a configuration may allow for selectively bypassing each of the electric power cells individually.

In an embodiment, the electric aircraft emergency power supply module may comprise less electric bypass circuits than electric power cells. In such an embodiment, each electric bypass circuit may be configured for selectively bypassing a group of electric power cells, respectively.

In an embodiment, the controller is configured for repeatedly bypassing at least one electric power cell and measuring the voltage of the bypassed at least on electric power cell for determining the current charging level of the at least one electric power cell.

In an embodiment comprising more than one electric power cell, the controller may be configured for collectively bypassing all the electric power cells and measuring the total voltage of all electric power cells of the electric aircraft emergency power supply module. Such an embodiment may result in an inexpensive configuration, as only a single electric bypass circuit and a single voltmeter are provided.

In an embodiment comprising more than one electric power cell, the controller may be configured for separately bypassing each of the electric power cells and measuring the voltage of each electric power cell individually. Such an embodiment may allow for determining the current charging level of the electric power cells very accurately. It may further allow for individually adapting the charging of the electric power cells to the individual charging levels of each electric power cell, which may result in a more gentle charging of the electric power cells.

In a further embodiment comprising more than one electric power cell, the electric power cells may be grouped into a plurality of groups, with each group comprising a plurality of electric power cells. In such an embodiment, the controller may be configured for separately bypassing each of the groups of electric power cells and measuring the total voltage of each group of electric power cells. Such a configuration may provide a compromise between an inexpensive configuration, in which all electric power cells are bypassed and measured collectively, and a more expensive configuration, in which all electric power cells are bypassed and measured individually.

In an embodiment comprising more than one electric power cell, the controller may be configured for collectively controlling the charging and discharging of all electric power cells of the electric aircraft emergency power supply module.

In another embodiment comprising more than one electric power cell, the controller may be configured for individually controlling the charging and discharging of the electric power cells of the electric aircraft emergency power supply module. The controller may in particular be configured for charging at least one of the electric power cells, while simultaneously discharging at least one other of the electric power cells.

In a further embodiment comprising more than one electric power cell, the electric power cells may be grouped into a plurality of groups, each group comprising a plurality of electric power cells, and the controller may be configured for individually charging and discharging the different groups of electric power cells. The controller may in particular be configured for charging the electric power cells of at least one group, while simultaneously discharging the electric power cells of at least one other group.

In embodiments comprising more than one electric power cell, above described features regarding receiving a voltage indication signal, determining the second derivative of the voltage indication signal with respect to time, and making a determination regarding the positive-to-negative zero crossing of the second derivative of the voltage indication signal may be carried out for the plurality of electric power cells as a whole, for each electric power cell individually, or for respective groups of electric power cells. In case the features are carried out for each electric power cell individually or for multiple groups of electric power cells, the multiple determinations regarding the positive-to-negative zero crossing may be compared/jointly looked at for determining whether it is time to simulate the behavior of a temperature sensitive element to indicate that the at least one electric power cell has reached a predefined temperature or whether the receiving of a continuing charging current from the electric charger is desired. In the latter case, individual electric power cells and/or individual groups of electric power cells may be bypassed in the ongoing charging operation.

Exemplary embodiments of the invention further include an aircraft emergency lighting module, which may be installed in an aircraft, in particular in a passenger cabin of an aircraft, for providing illumination in a case of emergency, in particular in an emergency situation, in which the regular illumination system, which is installed within the aircraft, is not operating.

An aircraft emergency lighting module according to an exemplary embodiment of the invention includes an electric aircraft emergency power supply module according to an exemplary embodiment of the invention and at least one aircraft emergency light. The electric aircraft emergency power supply module is coupled to the at least one aircraft emergency light, in order to supply electric power to the at least one aircraft emergency light, in particular in an emergency situation, in which the regular illumination system installed within the passenger cabin is not operating. The additional features, modifications, and effects, as described above with respect to exemplary embodiments of the electric aircraft emergency power supply module and with respect to exemplary embodiments of the method of charging at least one power cell of an electric aircraft emergency power supply module, apply to the aircraft emergency lighting module in an analogous manner.

In an embodiment, the aircraft emergency light is an interior aircraft emergency light. The aircraft emergency light may in particular be an exit signal light or an emergency cabin guidance light. Providing such an interior aircraft emergency light in the passenger cabin of an aircraft enhances the safety of the passengers in an emergency situation, in particular in an emergency situation, in which the regular interior lighting system of the aircraft is not operable.

In an embodiment, the aircraft emergency light is an exterior aircraft emergency light, such as an emergency slide illumination light or an emergency ground illumination light. Providing such an exterior aircraft emergency light enhances the safety of the passengers in an emergency situation, in which the passengers need to exit the aircraft without using a gangway, in particular via the emergency slides of the aircraft.

In an embodiment, the aircraft emergency lighting module further comprises an electric charger. The electric charger is coupled to the electric aircraft emergency power supply module and configured to charge the at least one electric power cell, thereby taking into account the simulated behavior of the temperature sensitive element, as provided by the controller of the electric aircraft emergency power supply module.

The electric charger may allow for charging the at least one electric power cell to a charging level, in which it contains sufficient energy for operating the at least one aircraft emergency light for at least a predefined amount of time, without overcharging the at least one electric power cell. As a result, the operational time of the aircraft emergency lighting module, which is provided after the charging process of the at least one electric power cell has been completed, may be optimized, without damaging the at least one electric power cell.

In an embodiment, the electric charger is adapted for charging electric power cells of the NiCd-type, which is a very common type of power cells employed in electric aircraft emergency power supply modules.

Exemplary embodiments of the invention also include an aircraft, such as an air plane or a helicopter, comprising at least one aircraft emergency lighting module according to an exemplary embodiment of the invention. The additional features, modifications, and effects, as described above with respect to exemplary embodiments of the electric aircraft emergency power supply module, with respect to exemplary embodiments of the method of charging at least one power cell of an electric aircraft emergency power supply module, and with respect to exemplary embodiments of an aircraft emergency lighting module, apply to the aircraft in an analogous manner.

The aircraft may, in particular, be a passenger aircraft with a passenger cabin for accommodating the passengers, and the at least one aircraft emergency lighting module may be installed within the passenger cabin of the aircraft. In an embodiment, a plurality of aircraft emergency lighting modules may be installed within the passenger cabin of the aircraft.

Alternatively or additionally, the aircraft may comprise at least one exterior aircraft emergency lighting module with at least one exterior aircraft emergency light, which is installed at an outer skin of the aircraft for illuminating an area outside the aircraft.

BRIEF DESCRIPTION OF THE FIGURES

In the following, exemplary embodiments will be described with respect to the accompanying drawings, wherein.

DETAILED DESCRIPTION

Figure 1A:
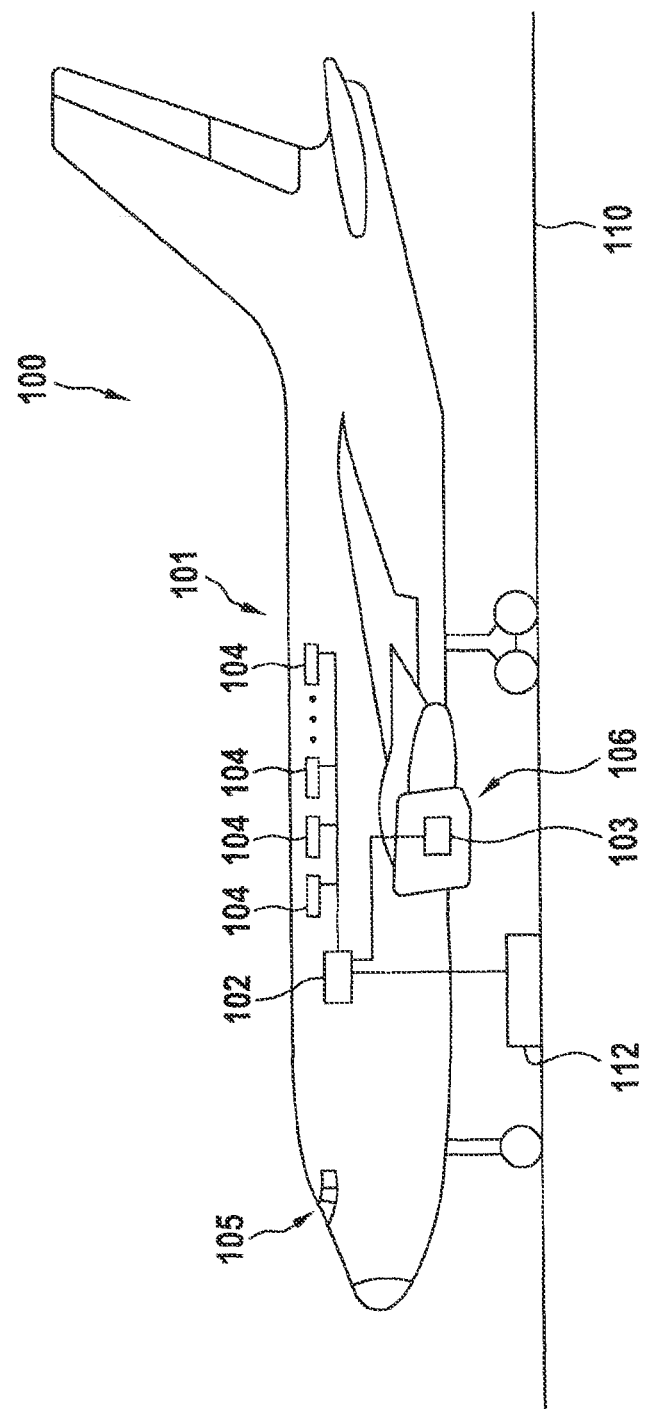
FIG. 1A shows a schematic side view of an air plane in accordance with an exemplary embodiment of the invention.
Figure 1B:
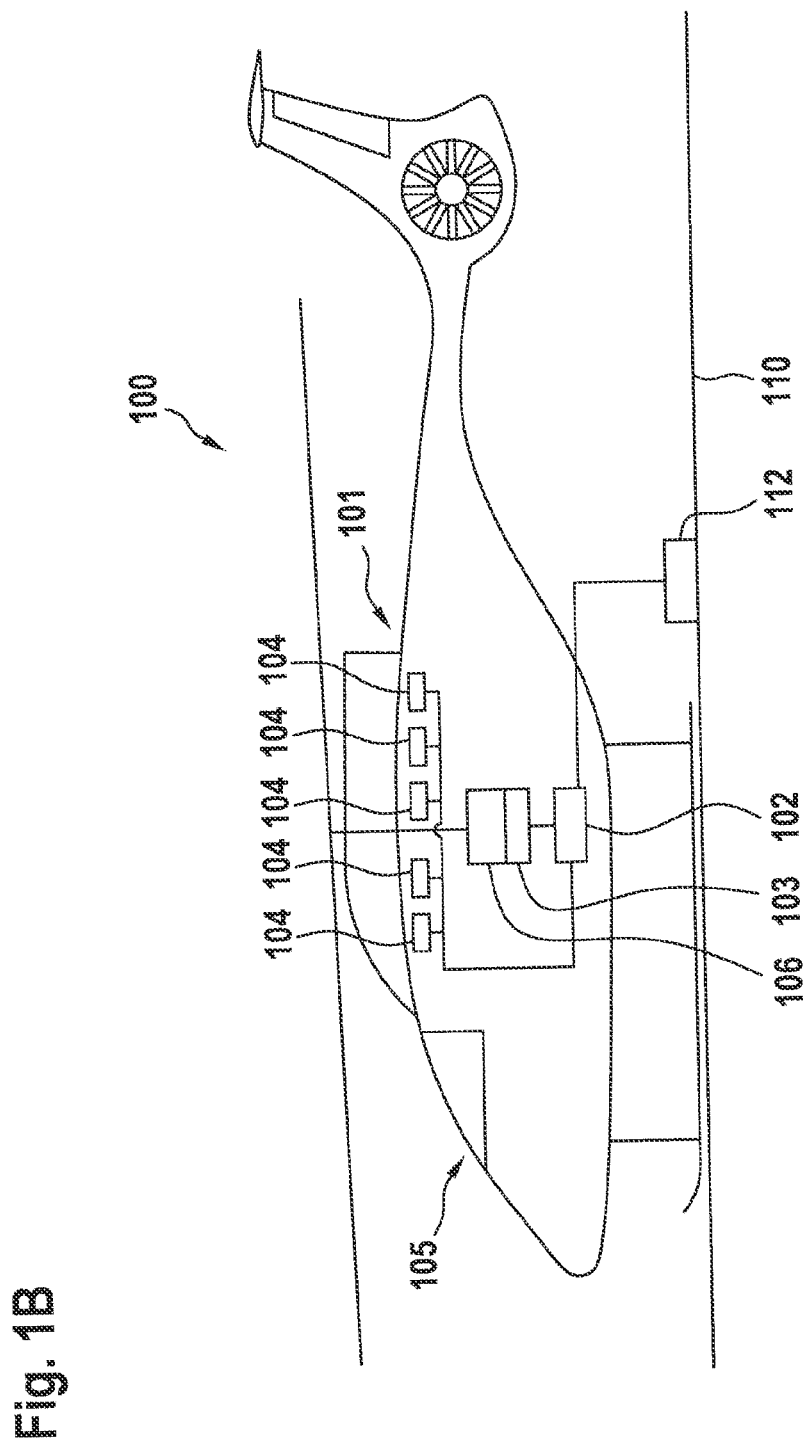
FIG. 1B shows a schematic side view of a helicopter in accordance with an exemplary embodiment of the invention.

FIG. 1A shows a schematic side view of an aircraft 100, in particular of an airplane, comprising a cockpit 105 and a passenger cabin 101. FIG. 1B shows a schematic side view of another aircraft 100, in particular of a helicopter, also comprising a cockpit 105 and a passenger cabin 101.

Both the airplane, depicted in FIG. 1A, and the helicopter, depicted in FIG. 1B, are aircraft 100 that are embodied in accordance with exemplary embodiments of the invention.

Both aircraft 100 comprise a plurality of aircraft emergency lighting modules 104 according to exemplary embodiments of the invention, which are arranged in the passenger cabin 101 of the respective aircraft 100. The aircraft emergency lighting modules 104 may, for example, be employed for the provision of exit signal lights or emergency cabin guidance lights.

Although not explicitly shown in the Figures, the aircraft 100 may also comprise exterior aircraft emergency lighting modules, which may be employed for the provision of emergency slide illumination lights or emergency ground illumination lights.

Each aircraft 100 further comprises an aircraft power supply system 102, which is configured for supplying electric energy to the aircraft emergency lighting modules 104.

The aircraft power supply system 102 is supplied with electric energy provided by at least one electric generator 103, which is driven by an engine 106 of the aircraft 100.

When the aircraft 100 is located on the ground 110 and the engine 106 is shut off, thus not driving the at least one electric generator 103, electric power may be supplied to the aircraft power supply system 102 from an external aircraft power supply 112, i.e., from an external aircraft power supply 112, which is not part of the aircraft 100 but located outside the aircraft 100.

Figure 2:
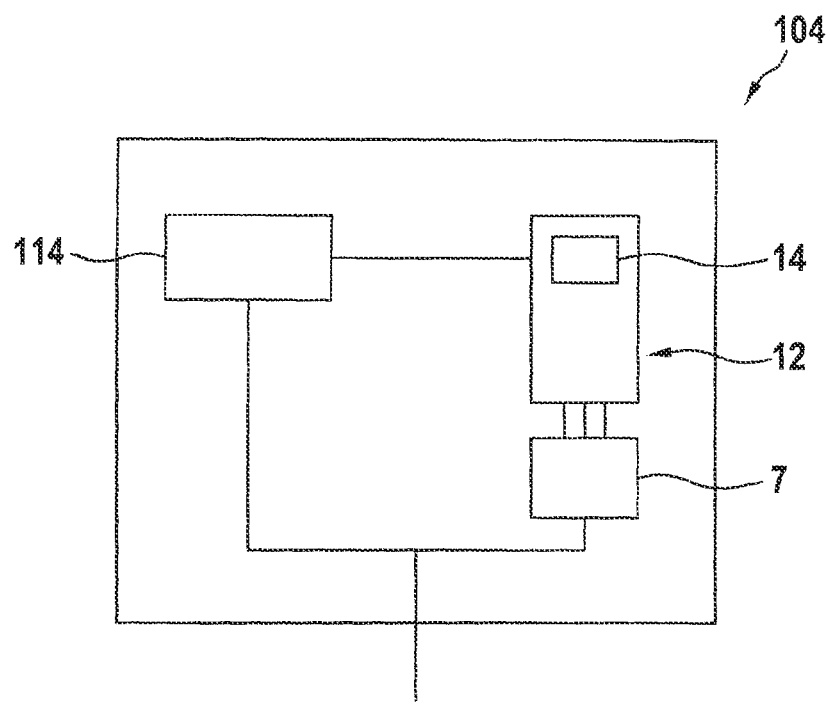
FIG. 2 shows a schematic diagram of an aircraft emergency lighting module according to an exemplary embodiment of the invention.

FIG. 2 depicts a schematic diagram of an aircraft emergency lighting module 104 according to an exemplary embodiment of the invention.

The aircraft emergency lighting module 104 comprises at least one aircraft emergency light 114, which is configured for illuminating the passenger cabin 101 of the aircraft 100 in an emergency situation, in particular in a situation in which the normal lighting system (not shown) of the aircraft 100 is not operable.

The at least one aircraft emergency light 114 may comprise at least one LED or other suitable kind of light source(s).

The aircraft emergency lighting module 104 further comprises an electric aircraft emergency power supply module 12, which is configured for supplying electric power to the at least one aircraft emergency light 114, when electric power is not available from the aircraft power supply system 102.

The electric aircraft emergency power supply module 12 comprises at least one rechargeable electric power cell 14 for storing and supplying electric power. The at least one rechargeable electric power cell 14 is regularly charged with electric power, as provided by the electric generator 103 and/or by the external aircraft power supply 112 via the aircraft power supply system 102.

The aircraft emergency lighting module 104 further comprises an electric charger 7. The electric charger 7 is configured for monitoring the charging level of the at least one rechargeable electric power cell 14 and for controlling the charging and discharging of the at least one rechargeable electric power cell 14.

Figure 3A:
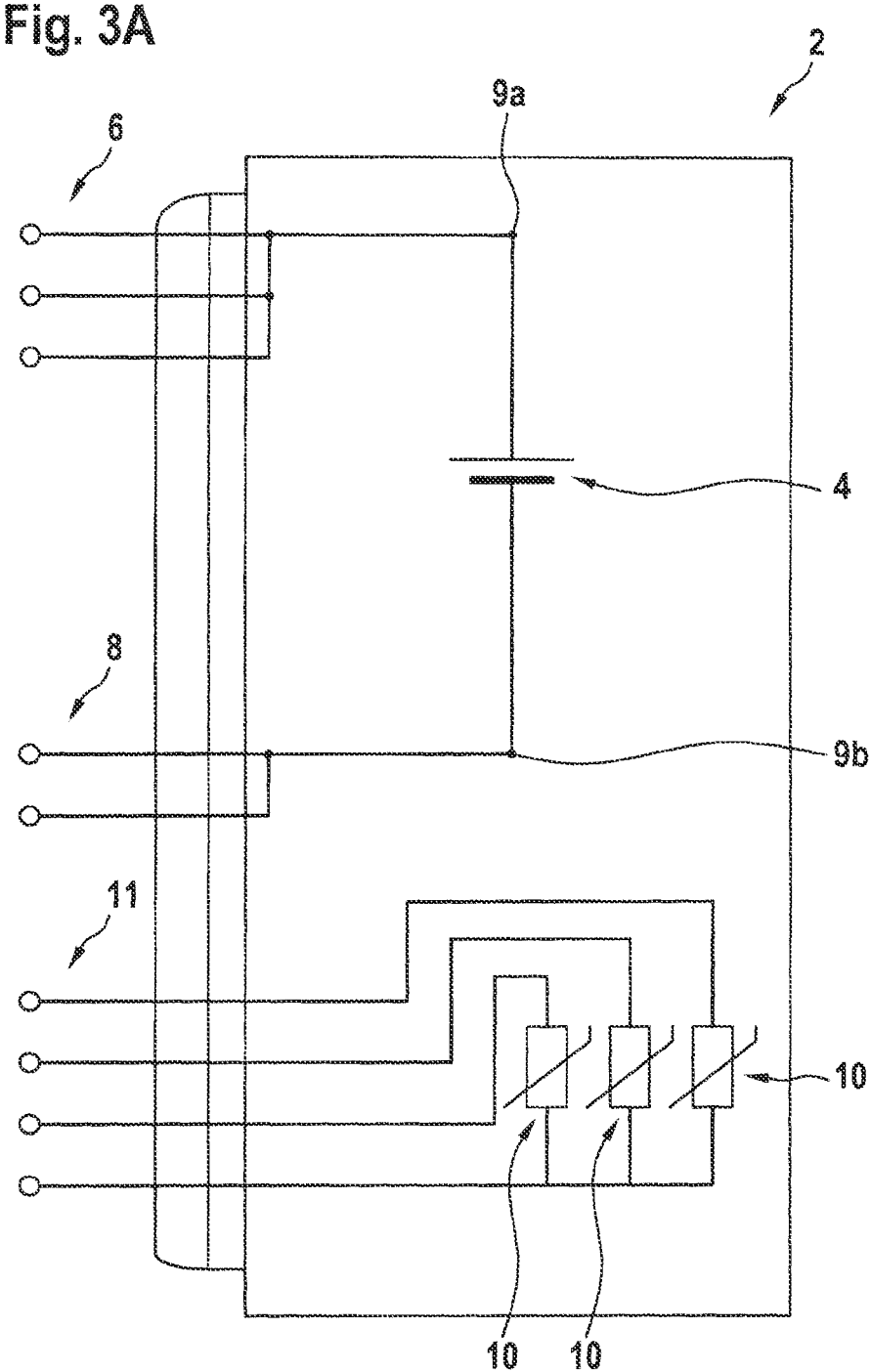
FIG. 3A shows a schematic diagram of a conventional electric aircraft emergency power supply module.

FIG. 3A shows a schematic diagram of a conventional electric aircraft emergency power supply module 2, depicted and explained for comparative purposes. In previous approaches, such conventional electric aircraft emergency power supply module 2 has been used instead of an electric aircraft emergency power supply module 12 in accordance with exemplary embodiments of the invention, as depicted in FIG. 2 and as explained in more detail with respect to FIG. 4.

The conventional electric aircraft emergency power supply module 2, as it is depicted in FIG. 3A, comprises a rechargeable electric power cell 4. In further exemplary embodiments, which are not explicitly shown in the Figures, the electric aircraft emergency power supply module 2 may comprise a plurality of rechargeable electric power cells 4, which may be connected with each other in a serial configuration and/or in a parallel configuration.

The electric aircraft emergency power supply module 2 further comprises at least two power supply terminals 6, 8. A first group of power supply terminals 6 is internally coupled with a first pole 9a of the electric power cell 4, and a second group of power supply terminals 8 is internally coupled with a second pole 9b of the electric power cell 4.

When the electric aircraft emergency power supply module 2 is installed within the aircraft 100, the power supply terminals 6, 8 are electrically connected with corresponding electric terminals (not shown) for electrically coupling the electric aircraft emergency power supply module 2 with the electric charger 7 (cf. FIG. 2).

The electric aircraft emergency power supply module 2, as depicted in FIG. 3A, further comprises three temperature sensitive elements 10, for example NTC thermal resistors 10 or PTC thermal resistors 10. The electric resistance R of each of the thermal resistors 10 changes as a function of its temperature. In consequence, the temperature sensitive elements 10 allow for sensing temperatures at the electric aircraft emergency power supply module 2. The temperature sensitive elements 10 may in particular allow for sensing temperatures of the electric power cell 4.

The temperature sensitive elements 10 are electrically connected with status indication terminals 11, provided at the outer periphery of the electric aircraft emergency power supply module 2. When the electric aircraft emergency power supply module 2 is installed within the aircraft 100, the status indication terminals 11 are electrically connected with corresponding terminals (not shown) of the electric charger 7 for transmitting the temperature information, provided by the temperature sensitive elements 10, to the electric charger 7.

The temperature information, provided by the temperature sensitive elements 10, allows the electric charger 7 to control the charging of the electric power cell 4 as a function of their temperature, as it is detected by the temperature sensitive elements 10.

In a conventional electric aircraft emergency power supply module 2, as it is depicted in FIG. 3A, the electric power cell 4 is usually of the nickel-cadmium type (NiCd-type). In consequence, the electric charger 7, installed within the aircraft 100, is configured for controlling the charging and discharging of the electric power cell 4 based on the charging characteristics, in particular based on a temperature over charging level function, of an electric power cell 4 of the NiCd-type.

Figure 3B:
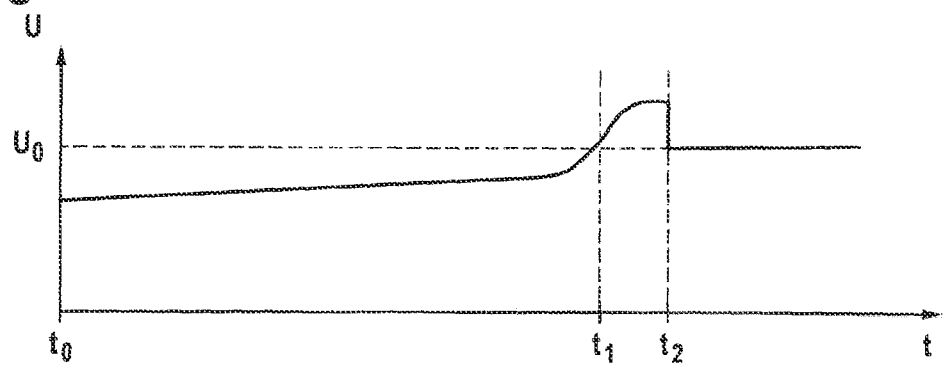
FIGS. 3B to 3D show diagrams illustrating the voltage, the temperature and the charging current of a power cell of the NiCd-type as a function of time, when charged within a conventional electric aircraft emergency power supply module as it is depicted in FIG. 3A.
Figure 3C:
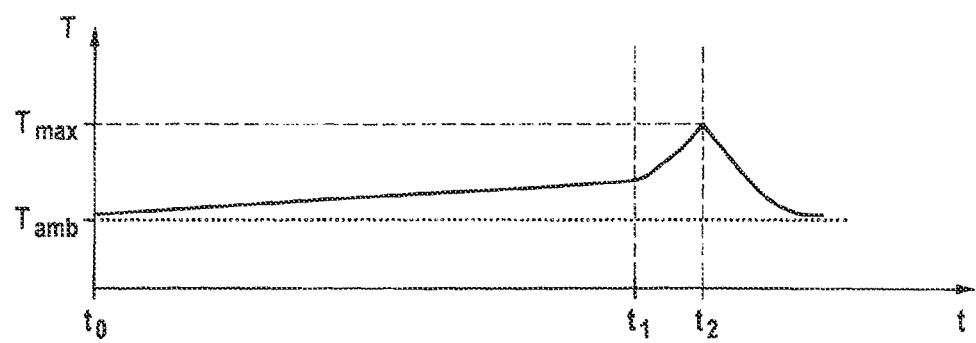
Figure 3D:
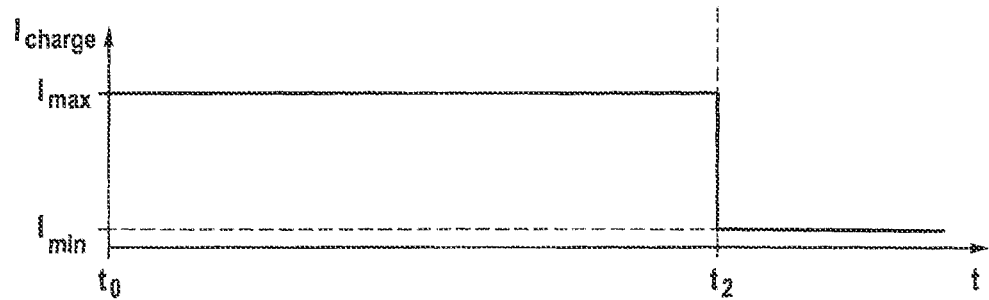

FIGS. 3B to 3D illustrate an exemplary process of charging a power cell 4 of the NiCd-type within a conventional electric aircraft emergency power supply module 2, as depicted in FIG. 3A.

FIG. 3B is a diagram showing the voltage U of the power cell 4 as a function of time t, FIG. 3C is a diagram showing the temperature T of the power cell 4 as a function of time t, and FIG. 3D is a diagram showing the charging current Icharge applied to the power cell 4 as a function of time t.

In a time period between t0 and t1, the power cell 4 is normally or rapidly charged by applying a first charging current Imax to the power cell 4 (see FIG. 3D). During said time period t0≤t≤t1, the voltage U (see FIG. 3B) and the temperature T (see FIG. 3C) of the power cell 4 increase only slowly over time t.

At time t1, the power cell 4 reaches its nominal capacity and is considered fully charged. As the first charging current Imax is still applied to the power cell 4, the voltage U (FIG. 3B) and the temperature T (FIG. 3C) of the power cell 4 increase rapidly over time t.

At time t2, the temperature T of the power cell 4, as it is detected by one or more of the temperature sensitive elements 10 of the electric aircraft emergency power supply module 2, reaches a threshold temperature Tmax. A corresponding output is supplied from the temperature sensitive element 10 via the status indication terminals 11 to the electric charger 7, installed within the aircraft 100.

When the detected temperature T reaches the threshold temperature Tmax, the electric charger 7 switches the charging current Icharge, applied to the power cell 4, from the first charging current Imax, which is applied to the power cell 4 during normal or rapid charging, to a second charging current Imin, which is considerably smaller than the first charging current Imax (see FIG. 3D).

The level of the second charging current Imin may, for example, be 1/30 to 1/10, in particular 1/20, of the level of the first charging current Imax. The second charging current Imin may in particular be a very small "trickle charging current", which compensates only for the self-discharging of the power cell 4.

As a result of reducing the charging current Icharge, applied to the power cell 4, to the smaller second charging current Imin, the voltage U of the power cell 4 drops to the nominal voltage U0 of a fully charged power cell 4 of said type, and the temperature T of the power cell 4 drops to a value close to the ambient temperature Tamb of the power cell 4. In this way, substantially no additional heat is generated by applying the small second charging current Imin to the power cell 4.

Figure 4A:
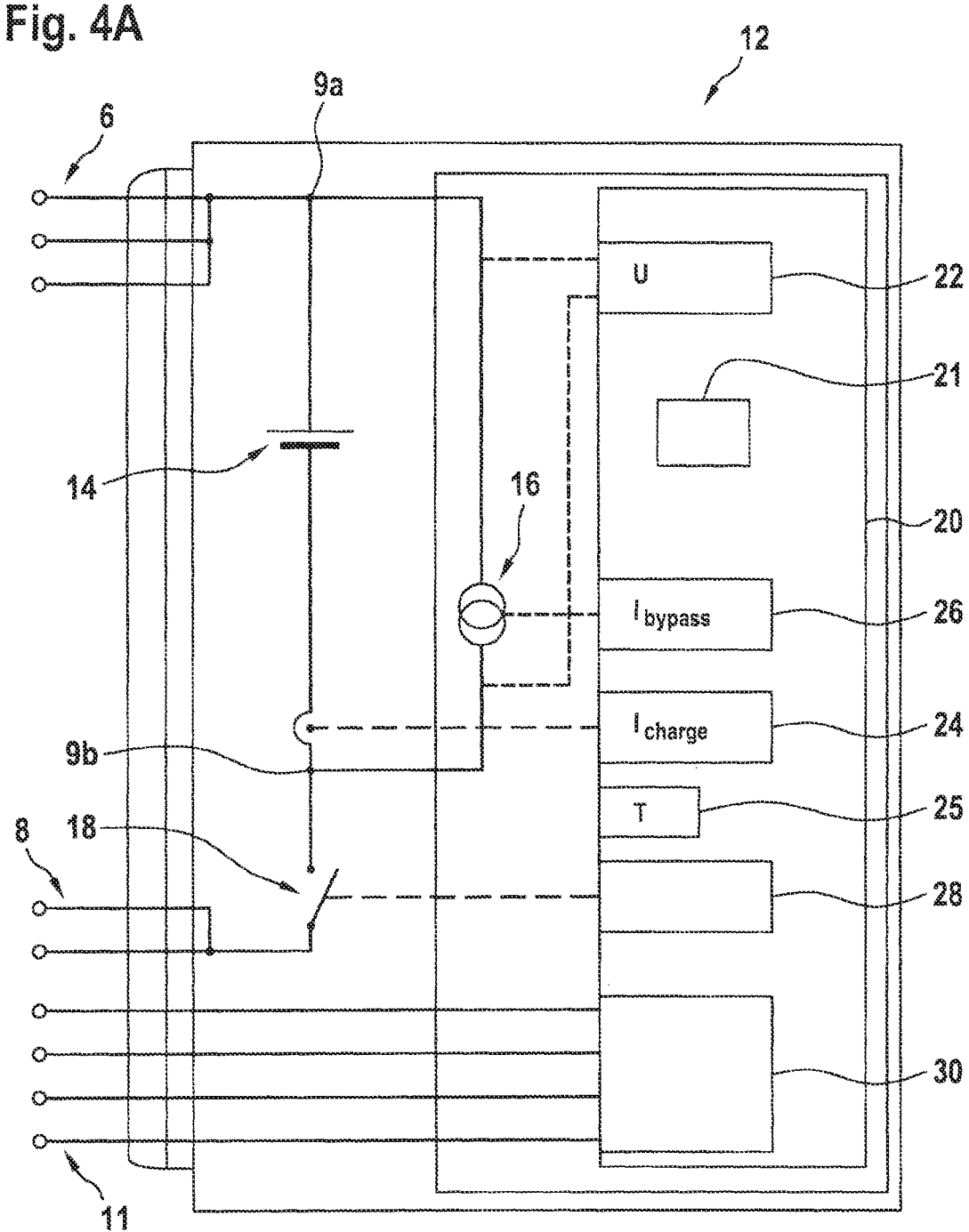
FIG. 4A shows a schematic diagram of an electric aircraft emergency power supply module according to an exemplary embodiment of the invention.

FIG. 4A shows a schematic diagram of an electric aircraft emergency power supply module 12 according to an exemplary embodiment of the invention.

The electric aircraft emergency power supply module 12, shown in FIG. 4A, comprises an electric power cell 14. For ease of illustration, only one electric power cell 14 is depicted in FIG. 4A. As in the conventional embodiment depicted in FIG. 3A, the electric aircraft emergency power supply module 12 may also comprise a plurality of electric power cells 14, which may be connected with each other in a serial configuration and/or in a parallel configuration. In particular embodiments, the electric aircraft emergency power supply module 12 may have a plurality of electric power cells 14, connected in series. Further in particular, the electric aircraft emergency power supply module 12 may have a series connection of seven electric power cells 14.

In an electric aircraft emergency power supply module 12 according to exemplary embodiments of the invention, the electric power cell 14 is not of the NiCd-type, but may be of a different type. The electric power cell 14 may in particular be of the nickel-metal hydride type (NiMH-type).

The electric aircraft emergency power supply module 12 also comprises at least two power supply terminals 6, 8. A first group of power supply terminals 6 is internally coupled with a first pole 9a of the electric power cell 14, and a second group of power supply terminals 8 is internally coupled with a second pole 9b of the electric power cell 14.

When the electric aircraft emergency power supply module 12 is installed within the aircraft 100, the power supply terminals 6, 8 are electrically connected with corresponding electric terminals (not shown) of the electric charger 7 for electrically coupling the electric aircraft emergency power supply module 12 with the electric charger 7 (cf. FIG. 2).

The electric aircraft emergency power supply module 12 comprises an electric bypass circuit 16 and at least one isolation switch 18. The electric bypass circuit 16 allows for selectively bypassing the electric power cell 14. The at least one isolation switch 18 allows for selectively connecting the electric power cell 14 with at least one of the power supply terminals 6, 8 and disconnecting the electric power cells 14 from at least one of the power supply terminals 6, 8.

The electric aircraft emergency power supply module 12 further comprises a controller 20.

The controller 20 includes or is coupled with a voltage sensor 22, which is adapted for measuring the voltage U of the electric power cell 14 and providing a voltage indication signal U(t).

Optionally, the controller 20 may further include an ampmeter 24 for measuring an electric current I, flowing through the electric power cell 14, and/or a temperature sensor 25 for measuring the temperature of the electric aircraft emergency power supply module 2, in particular the temperature of the electric power cell 4.

In order to allow for measuring the voltage U of the electric power cell 14, without the measurement being distorted by a charging current Icharge flowing through the electric power cell 14, the controller 20 comprises a bypass controller 26, which is configured for controlling the electric bypass circuit 16. When the electric bypass circuit 16 is activated, any charging current Icharge, supplied from the electric charger 7 via the power supply terminals 6, 8, is bypassed by the electric power cell 14 through the electric bypass circuit 16. As a result, the internal voltage Uint of the electric power cell 14 may be measured by the voltage sensor 22, without the measurement being distorted by the charging current Icharge. While such a set-up may be beneficial in some embodiments, it is stressed that the electric aircraft emergency power supply module 12 may also be provided without the electric bypass circuit 16 and that the voltage U of the electric power cell 14 may be measured, while the charging current Icharge is applied thereto.

The controller 20 further includes an isolation switch activator 28, which allows for selectively activating and deactivating the isolation switch 18 for selectively connecting and disconnecting the electric power cell 14 to/from the power supply terminals 6, 8, respectively.

The controller 20 further includes a simulator 30, which is configured for simulating the electric behavior of at least one temperature sensitive element 10, as it is provided in a conventional electric aircraft emergency power supply module 2 (cf. FIG. 3A).

The simulator 30 is in particular configured for simulating the electric behavior of at least one temperature sensitive element 10 as a function of the determined charging level of the electric power cell 14, as it will be described in more detail below. The simulator 30 is further configured for providing its simulated output at the status indication terminals 11 of the electric aircraft emergency power supply module 2.

The controller 20 is configured for determining the charging level of the electric power cell 4 from the output of the voltage sensor 22.

The controller 20 is in particular configured for receiving a voltage indication signal, which is indicative of the voltage U, provided by the voltage sensor 22, as a function of time t, and for determining the second derivative U"(t)=d2U(t)/dt2 of the voltage indication signal U(t) with respect to time t.

The controller 20 is in particular configured for detecting when the second derivative U"(t) of the voltage indication signal with respect to time t changes from a positive value to a negative value ("positive-to-negative zero crossing") and for causing the simulator 30 to simulate the behavior of a temperature sensitive element 10, indicating that the at least one electric power cell 14 has reached a predefined temperature Tmax for causing the electric charger 7 to stop charging the at least one electric power cell 4 further. The predefined temperature Tmax corresponds to a predefined charging level, at which a conventional electric power cell 4 (see FIG. 3A) is fully charged or nearly fully charged.

The simulator 30 may be a dedicated electric simulator circuit, which has been designed for providing the desired functionalities. The simulator 30 may also be provided as a software program, which is executed by a suitable microprocessor 21.

A positive-to-negative zero crossing of the second derivative U"(t) of the voltage indication signal may be determined in different ways.

One option for detecting a positive-to-negative zero crossing is detecting a "hard zero crossing", in which the controller 20 is configured for detecting that the second derivative U"(t) of the voltage indication signal changes from a positive value (U"(t)>0) to a negative value (U"(t)<0).

Alternatively, the controller 20 may be configured for detecting an "expected zero crossing". An "expected zero crossing" is detected when the second derivative U"(t) of the voltage indication signal drops below a positive threshold value U"th+(U"(t)<U"th+), which is above and close to zero.

As a further alternative, a zero crossing of the second derivative U"(t) of the voltage indication signal may detected when the indication signal drops below a negative threshold voltage U"th−(U"(t)<U"th−), which is below and close to zero.

The described examples for determining a positive-to-negative zero crossing of the second derivative U"(t) of the voltage indication signal are only exemplary and not exclusive. Other methods of determining a positive-to-negative zero crossing of the second derivative U"(t) of the voltage indication signal may be employed as well.

The controller 20 may comprise at least one microprocessor 21, and the desired functionalities of the controller 20, which may also include the functionalities of the simulator 30, may be realized by one or more software programs, which are executed by said at least one microprocessor 21.

The simulator 30 is configured such that the output, provided at the status indication terminals 11 of the simulator 30, causes the electric charger 7 to control the charging of the electric power cell 14 as a function of the current charging level of the electric power cell 14.

The output, provided by the simulator 30 at the status indication terminals 11, in general does not correspond to the actual temperature of the electric power cell 14, and the output, provided by the simulator 30, generally also does not correspond to the temperature of an electric power cell 4 of the NiCd-type, as it is employed in a conventional electric aircraft emergency power supply module 2, when having the determined charging level.

Instead, the simulator 30 is configured for providing outputs at the status indication terminals 11 over time, which are based on the current charging levels of the electric power cell 14, wherein the current charging levels have been determined from the voltage indication signal U(t), in particular from the second derivative U"(t) of the voltage indication signal U(t). Determining the current charging levels from the voltage indication signal U(t) according to an exemplary embodiment of the invention will be described in more detail further below with reference to FIGS. 4B and 4C.

The outputs, provided by the simulator 30, cause the electric charger 7 to control the charging of the electric power cell 14 in accordance with a predefined charging procedure, as it is defined for the actually employed type of electric power cell 14 and the currently determined charging level of said electric power cell 14.

Controlling the charging of the electric power cell 14 may in particular include stopping any further charging of the electric power cell 14, when the second derivative U"(t) of the voltage indication signal U(t) with respect to time t has changed from positive to negative values ("positive-to-negative zero crossing"), as it has been described before.

Alternatively, controlling the charging of the electric power cell 14 may include switching the charging current to a very small "trickle charging current", which compensates only for the self-discharging of the power cell 14, as it has been described before with reference to FIGS. 3B to 3D, when the second derivative U"(t) of the voltage indication signal U(t) with respect to time t has changed from positive to negative values ("positive-to-negative zero crossing").

Figure 4B:
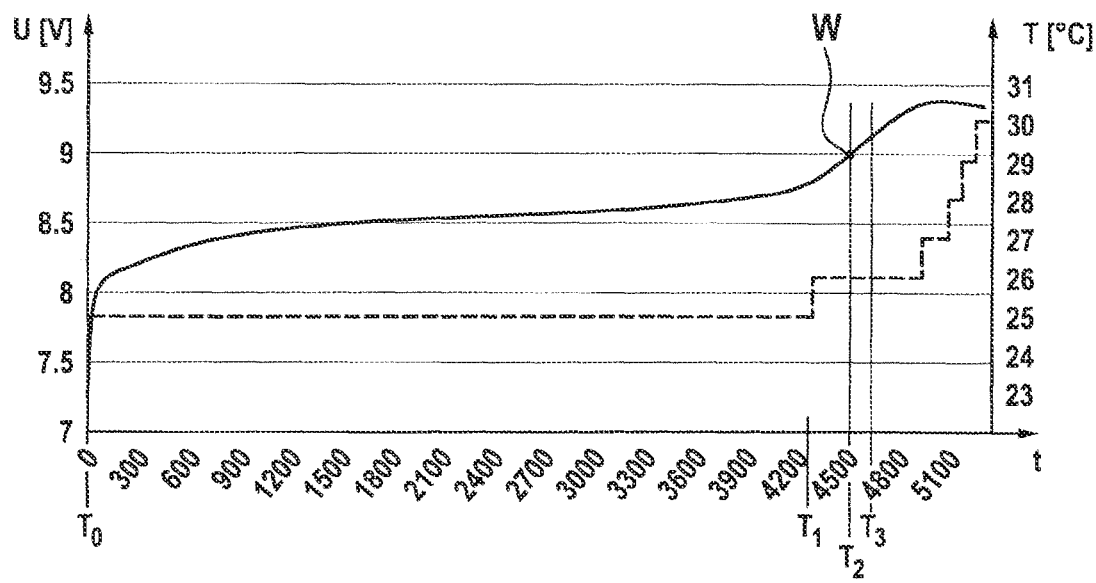
FIG. 4B shows a diagram in which the voltage and the temperature of a series connection of seven electric power cells of the NiMH-type are plotted during a charging operation as a function of time.

FIG. 4B shows a diagram in which the voltage indication signal U(t) (solid line) and the temperature T(t) (dashed line)

of a series connection of seven electric power cells 14 of the NiMH-type are plotted on the vertical axis over time t, which is plotted along the horizontal axis.

The diagram in FIG. 4B shows that, during a first phase of the charging process (T0<t<T1), the temperature T(t) of the electric power cell 14 of the NiMH-type is basically constant and the voltage indication signal U(t) increases only gradually over time t.

At t=T1, the first phase of the charging process ends. The voltage indication signal U(t) starts to increase more rapidly, and the temperature T increases as well.

In a following time interval T1<t<T3, the curve representing the voltage indication signal U(t) shows a turning point W, i.e. the second derivative U"(t)=d2U(t)/dt2 of the voltage indication signal U(t) changes from a positive value to a negative value (U"(t)<0). This can also be seen in FIG. 4C, which will be discussed in more detail below. At the turning point W, the voltage indication signal U(t) changes from a left hand turn to a right hand turn.

According to an embodiment of the invention, this change of the second derivative U"(t) from a positive value to a negative value is considered as an indicator that the electric power cell(s) 14 has/have reached a charging level at which the charging of the electric power cell(s) 14 should be stopped, in order to prevent a further increase of the temperature T and a resulting potential damage of the electric power cell(s) 14.

Figure 4C:
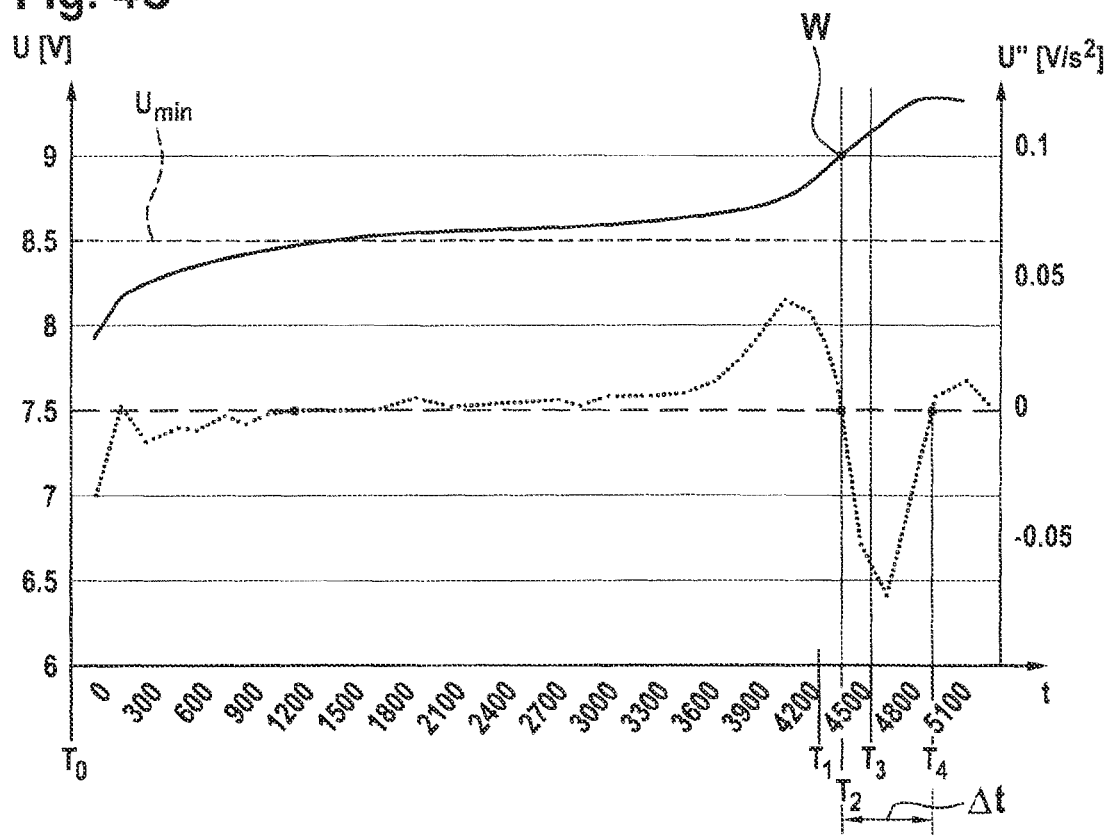
FIG. 4C shows a diagram in which the voltage and the second derivative of the voltage, measured at the series connection of seven electric power cells of the NiMH-type during a charging operation, are plotted as a function of time.

In FIG. 4C, the voltage indication signal U(t) (solid line) and the second derivative U"(t) (dotted line) of the voltage indication signal U(t), as measured at the series connection of seven electric power cells 14 of the NiMH-type, are plotted on the vertical axis as a function of time t, which is plotted on the horizontal axis.

FIG. 4C shows that the second derivative U"(t) of the voltage indication signal U(t) changes from a positive value to a negative value around t=T2. This is called a "positive-to-negative zero crossing" of the second derivative U"(t) of the voltage indication signal U(t). The second derivative U"(t) of the voltage indication signal U(t) remains negative in the following time interval Δt (T2<t<T4), and changes back to a positive value at t=T4.

The positive-to-negative zero crossing of the second derivative of the voltage indication signal indicates that at t=T2, the charging level of the electric power cells 14 has reached a level at which the charging of the electric power cells 14 should be stopped, in order to prevent a further increase of the temperature T and potential damage of the electric power cells 14.

In order to avoid an accidental premature stopping of the charging of the electric power cells 14 due to temporary fluctuations of the voltage indication signal U(t), the charging of the electric power cells 14 may be stopped only if the voltage indication signal U(t) exceeds a predefined minimum voltage Umin.

In the example depicted in FIG. 4C, the predefined minimum voltage Umin is set to 8.5 V, which is indicated by the upper dashed line in FIG. 4C. Although the second derivative U"(t) of the voltage indication signal U(t) is negative at approximately Ta=1200 s, this will not result in stopping the charging of the electric power cell 14, as the voltage indication signal U(t) at Ta=1200 does not exceed the predefined minimum voltage Umin of 8.5 V. In consequence, an accidental premature stopping of the charging of the electric power cells 14 is prevented.

The predefined minimum voltage Umin may be set to a constant value. The predefined minimum voltage Umin may in particular be set to a suitable value in accordance with the particular implementation of the electric aircraft emergency power supply module 12.

As the voltage of a fully charged electric power cell(s) 14 may be a function of the current temperature T of the electric power cell(s) 14, in an alternative embodiment, the predefined minimum voltage Umin may be set as a function of the current temperature T of the electric power cell(s) 14. The current temperature T of the electric power cell(s) 14 may, for example, be measured by the temperature sensor 25 (see FIG. 4A).

As an alternative or as an additional measure for preventing a premature stopping of the charging of the electric power cell(s) 14, the charging of the electric power cell(s) 14 may be stopped only if a negative second derivative U"(t) of the voltage indication signal U(t) is repeatedly detected and/or if the second derivative U"(t) of the voltage indication signal U(t) remains negative at least for a predetermined time interval. The predetermined time interval may, for example, be set to a value in a range of between 30 seconds and 180 seconds.

In the example depicted in FIG. 4C, the second derivative U"(t) of the voltage indication signal U(t) remains negative for 600 s, namely in the time interval Δt starting at T2=4500 s and ending at T4=5100 s. Within such time interval Δt of 600 s, there is ample time to reliably determine that the electric power cells 14 have reached their predefined charging level and that therefore the charging of the electric power cells 14 is to be stopped, in order to prevent an increase of the temperature T and a resulting potential damage of the electric power cells 14.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An electric aircraft emergency power supply module, which is connectable to an electric charger and which comprises:
   at least one electric power cell for storing and supplying electric energy;
   at least one voltage sensor for measuring the electric voltage (U) of the at least one electric power cell; and
   a controller for controlling a charging of the at least one electric power cell, wherein controlling the charging of the at least one electric power cell includes:
      receiving a voltage indication signal (U(t)), indicative of the electric voltage (U) of the at least one electric power cell over time (t), from the at least one voltage sensor;
      determining the second derivative (U"(t)) of the voltage indication signal (U(t)) with respect to time (t); and
      when the electric voltage (U) of the at least one electric power cell exceeds a predefined minimum voltage value ($U_{min}$), simulating on the basis of a positive-to-negative zero crossing of the second derivative (U"(t)) of the voltage indication signal (U(t)) the behavior of a temperature sensitive element to indicate that the at least one electric power cell has reached a predefined temperature, which corresponds to a predefined charging level, for causing the electric charger to stop charging the at least one electric power cell.

2. An electric aircraft emergency power supply module according to claim 1, wherein the voltage indication signal (U(t)) comprises a plurality of voltage indication values and wherein the controller is configured for receiving a new voltage indication value, determining the second derivative (U"(t)) of the voltage indication signal (U(t)), and making a determination regarding the positive-to-negative zero crossing of the second derivative (U"(t)) of the voltage indication signal (U(t)) in a repeated manner in time intervals that are in the range of between 1 second and 120 seconds.

3. An electric aircraft emergency power supply module according to claim 1, wherein the controller is configured to determine that the positive-to-negative zero crossing has occurred, when the second derivative (U"(t)) of the voltage indication signal (U(t)) is negative for at least a predetermined period of time or when the second derivative (U"(t)) of the voltage indication signal (U(t)) is negative for at least a predefined number of consecutive voltage indication values.

4. An electric aircraft emergency power supply module according to claim 1, wherein the at least one electric power cell is at least one electric power cell of the NiMH-type.

5. An electric aircraft emergency power supply module according to claim 1, wherein the predefined temperature is the temperature of an electric power cell of the NiCd-type that is fully charged.

6. An electric aircraft emergency power supply module according to claim 1, wherein the controller is configured for simulating the electric behavior of at least one NTC thermal resistor or of at least one PTC thermal resistor.

7. An aircraft emergency lighting module, comprising:
an electric aircraft emergency power supply module according to claim 1; and
an aircraft emergency light, coupled to the electric aircraft emergency power supply module;
wherein the electric aircraft emergency power supply module is configured to supply electric power to the aircraft emergency light in case of an emergency.

8. An aircraft emergency lighting module according to claim 7, wherein the aircraft emergency light is an interior aircraft emergency light, an emergency cabin guidance light, or an exterior aircraft emergency light.

9. An aircraft emergency lighting module according to claim 7, further comprising:
an electric charger, coupled to the electric aircraft emergency power supply module;
wherein the electric charger is configured to charge the electric aircraft emergency power supply module based on the simulated behavior of the temperature sensitive element, as provided by the controller of the electric aircraft emergency power supply module.

10. An aircraft comprising:
an aircraft emergency lighting module according to claim 8.

11. A method of charging at least one electric power cell of an electric aircraft emergency power supply module, the method comprising:
supplying an electric charging current from an electric charger to said at least one electric power cell for charging said at least one electric power cell;
measuring the electric voltage (U) of the at least one electric power cell;
determining the second derivative (U"(t)) of the measured electric voltage (U) with respect to time (t); and
when the electric voltage (U) of the at least one electric power cell exceeds a predefined minimum voltage value ($U_{min}$), simulating on the basis of a positive-to-negative zero crossing of the second derivative (U"(t)) of the measured electric voltage (U), the behavior of a temperature sensitive element to indicate that the at least one electric power cell has reached a predefined temperature, which corresponds to a predefined charging level, for causing the electric charger to stop charging the at least one electric power cell.

12. A method according to claim 11, wherein the steps of measuring the electric voltage (U) of the at least one electric power cell, determining the second derivative (U"(t)) of the measured electric voltage (U), and making a determination regarding the positive-to-negative zero crossing of the second derivative (U"(t)) are carried out repeatedly in time intervals that are in the range of between 1 second and 120 seconds.

13. A method according to claim 11,
wherein the method includes determining that the positive-to-negative zero crossing has occurred, when the second derivative (U"(t)) of the measured electric voltage (U) is negative for at least a predetermined period of time or when the second derivative (U"(t)) of the measured electric voltage (U) is negative for at least a predefined number of consecutive measurements.

14. A method according to claim 11, wherein the at least one electric power cell is at least one electric power cell of the NiMH-type and/or wherein the predefined temperature is the temperature of an electric power cell of the NiCd-type that is fully charged.

* * * * *